US010630569B2

(12) United States Patent
Kelley, Jr. et al.

(10) Patent No.: US 10,630,569 B2
(45) Date of Patent: Apr. 21, 2020

(54) AUTOMATICALLY DETERMINING OVER-THE-TOP APPLICATIONS AND SERVICES

(71) Applicant: NetScout Systems, Inc, Westford, MA (US)

(72) Inventors: Bruce A. Kelley, Jr., Westford, MA (US); Gregory Mayo, Salem, NH (US)

(73) Assignee: NetScout Systems, Inc, Westford, MA (US)

(*) Notice: Subject to any disclaimer, the term of this patent is extended or adjusted under 35 U.S.C. 154(b) by 116 days.

(21) Appl. No.: 15/809,761

(22) Filed: Nov. 10, 2017

(65) Prior Publication Data

US 2019/0149445 A1   May 16, 2019

(51) Int. Cl.
*H04L 12/26* (2006.01)
*H04L 29/06* (2006.01)
(Continued)

(52) U.S. Cl.
CPC .......... *H04L 43/12* (2013.01); *H04L 9/3297* (2013.01); *H04L 41/5058* (2013.01);
(Continued)

(58) Field of Classification Search
CPC ..... H04L 43/12; H04L 43/08; H04L 63/1408; H04L 9/3297; H04L 69/22; H04L 65/1063; H04L 67/02
(Continued)

(56) References Cited

U.S. PATENT DOCUMENTS

| 6,892,236 | B1 * | 5/2005 | Conrad | G06F 11/3409 |
|---|---|---|---|---|
| | | | | 709/203 |
| 2011/0161492 | A1 * | 6/2011 | Granville | G06Q 30/02 |
| | | | | 709/224 |

(Continued)

FOREIGN PATENT DOCUMENTS

EP   2988498 A1   2/2016

OTHER PUBLICATIONS

Extended European Search Report for European Patent Application No. EP18204877.7, dated Feb. 22, 2019.
(Continued)

*Primary Examiner* — David R Lazaro
*Assistant Examiner* — Berhanu Shitayewoldetadik
(74) *Attorney, Agent, or Firm* — Locke Lord LLP; Scott D. Wofsy; Christopher J. Capelli

(57) ABSTRACT

A method for determining Over-The-Top (OTT) applications includes receiving, by an active agent, a list of OTT service platforms to be monitored. The received list includes URLs associated with various applications that are delivered by the OTT service platforms. The active agent connects to the URLs to determine information uniquely identifying OTT applications. The active agent stores the information in a repository. A network monitor monitors data flows between a plurality of sources and destinations on a network. Each of the data flows includes a plurality of data packets of the various applications that are delivered OTT. The network monitor extracts at least a portion of header information from each of monitored data packets. The network monitor identifies an OTT application occurring on the network based on the extracted header information and based on the information uniquely identifying various applications stored in the repository.

19 Claims, 5 Drawing Sheets

(51) Int. Cl.
*H04L 9/32* (2006.01)
*H04L 12/24* (2006.01)
*H04L 29/08* (2006.01)

(52) U.S. Cl.
CPC ............ *H04L 43/026* (2013.01); *H04L 43/08* (2013.01); *H04L 63/1408* (2013.01); *H04L 69/22* (2013.01); *H04L 65/1063* (2013.01); *H04L 67/02* (2013.01)

(58) Field of Classification Search
USPC .......................................................... 709/224
See application file for complete search history.

(56) References Cited

U.S. PATENT DOCUMENTS

| | | | |
|---|---|---|---|
| 2012/0254403 A1 | 10/2012 | Imbimbo et al. | |
| 2014/0351870 A1* | 11/2014 | Amine | H04N 21/2665 725/92 |
| 2015/0085664 A1* | 3/2015 | Sachdev | H04L 41/5019 370/236 |
| 2017/0034114 A1* | 2/2017 | McEachern | G06Q 10/10 |
| 2018/0260498 A1* | 9/2018 | Nagaraja | G06F 30/3323 |
| 2018/0331908 A1* | 11/2018 | Gal | H04L 41/0893 |
| 2019/0068443 A1* | 2/2019 | Li | G06N 20/00 |

OTHER PUBLICATIONS

"Telecommunications and Internet converged Services and Protocols for Advanced Networking (TISPAN); Peer-to-peer for content delivery for IPTV services: analysis of mechanisms and NGN impacts", Technical Report, European Telecommunications Standards Institute (ETSI), 650, Route Des Lucioles ; F-06921 Sophia-Antipolis ; France, vol. TISPAN 2, No. V3.1.1, Feb. 28, 2010 (Feb. 28, 2010), XP014046308, * chapter 6.7.7 *; * figure 6.7.7.1 *.

* cited by examiner

AUTOMATICALLY DETERMINING OVER-THE-TOP APPLICATIONS AND SERVICES

FIELD OF THE INVENTION

Embodiments of the present invention relate generally to monitoring data packets transmitted over a network, and specifically to automatically determining over-the-top applications and services.

BACKGROUND OF THE INVENTION

To optimize the performance and operation of modern computer networks, network operators routinely use network probes to monitor network traffic as well as measure end-user experience by calculating performance and quality parameters in real-time. These parameters include, but are not limited to, bit rate, jitter, packet drop rate or bit error rate, and packet latency. However, the enormous, and increasing, amounts of data transmitted over wired and wireless networks at high data transfer speeds, particularly with the introduction of the 10 gigabit ("10 GbE") networking standard, present a challenge to real-time monitoring of network performance.

As the future of technology gears toward an all-IP network, the number of available over-the-top (OTT) applications is expected to increase. An OTT application is an application that uses a data channel provided by an Internet service provider (ISP) to connect to the Internet instead of using any special data handling features or network services offered thereby.

In accordance with conventional technology, OTT application data is sometimes routed over a commercial wireless network via a virtual private network (VPN) tunnel (which involves the tunneling of original IP packets inside outer IP packets in an encrypted fashion). A VPN tunnel provides additional transmission security to OTT application data, which is especially helpful to OTT applications that lack end-to-end encryption on their network connections.

Quality of service (QoS) refers to a set of performance characteristics by which a commercial wireless network is expected to convey data traffic to and from a client (quality of service (QoS) control mechanisms are applied to both the wireless and wireline components of a commercial network). Specific performance characteristics may include throughput (e.g., data quantity transmitted per unit time), latency (e.g., time delay between transmission and receipt of data), loss rate (e.g., frequency by which a commercial wireless network fails to deliver portions of transmitted data), jitter (e.g., a measure of variance of other characteristics), etc.

Currently, there are no efficient techniques to identify and process OTT application data, primarily due to an encrypted nature of transmitted IP packets. Hence, a successful means of quickly identifying data related to various OTT applications, including OTT applications transmitting data over a VPN tunnel, without parsing an encrypted payload is needed.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for determining Over-The-Top (OTT) applications and services without parsing an encrypted payload includes receiving, by an active agent, a list of OTT service platforms to be monitored by the active agent. The received list includes a plurality of URLs associated with various applications that are delivered by the OTT service platforms. The active agent connects to the plurality of URLs to determine information uniquely identifying each of the OTT applications. The active agent stores the information uniquely identifying each OTT application in a repository. A network monitor monitors a plurality of data flows between a plurality of sources and destinations on a network. Each of the plurality of data flows includes a plurality of data packets of the various applications that are delivered by the OTT service platforms. The network monitor extracts at least a portion of header information from each of the plurality of monitored data packets. The network monitor identifies an OTT application occurring on the network based on the extracted header information and based on the information uniquely identifying various applications stored in the repository.

In another aspect, a system for determining Over-The-Top (OTT) applications and services without parsing an encrypted payload includes a repository configured to receive and store information uniquely identifying one or more OTT applications. The system further includes an active agent having a first processor and a first memory device coupled to the first processor in communication with the repository. The first memory device contains a set of instructions that, when executed by the first processor, cause the first processor to receive a list of OTT service platforms to be monitored. The received list includes a plurality of URLs associated with various applications that are delivered by the OTT service platforms. The set of instructions that, when executed by the first processor, further cause the first processor to connect to the plurality of URLs to determine information uniquely identifying one or more of the OTT service platform applications and to store the information uniquely identifying one or more of the OTT applications in the repository. The system further includes a network monitor having a second processor and a second memory device coupled to the second processor in communication with the repository. The second memory device contains a set of instructions that, when executed by the second processor, cause the second processor to monitor a plurality of data flows between a plurality of sources and destinations on a network. Each of the plurality of data flows includes a plurality of data packets of the various applications that are delivered by the OTT service platforms. The set of instructions that, when executed by the second processor, further cause the second processor to extract at least a portion of header information from each of the plurality of monitored data packets and to identify an OTT application occurring on the network based on the extracted header information and based on the information uniquely identifying various OTT applications stored in the repository.

BRIEF DESCRIPTION OF THE DRAWINGS

The accompanying appendices and/or drawings illustrate various, non limiting, pies, inventive aspects in accordance with the present disclosure.

DETAILED DESCRIPTION OF CERTAIN EMBODIMENTS

Figure 1:
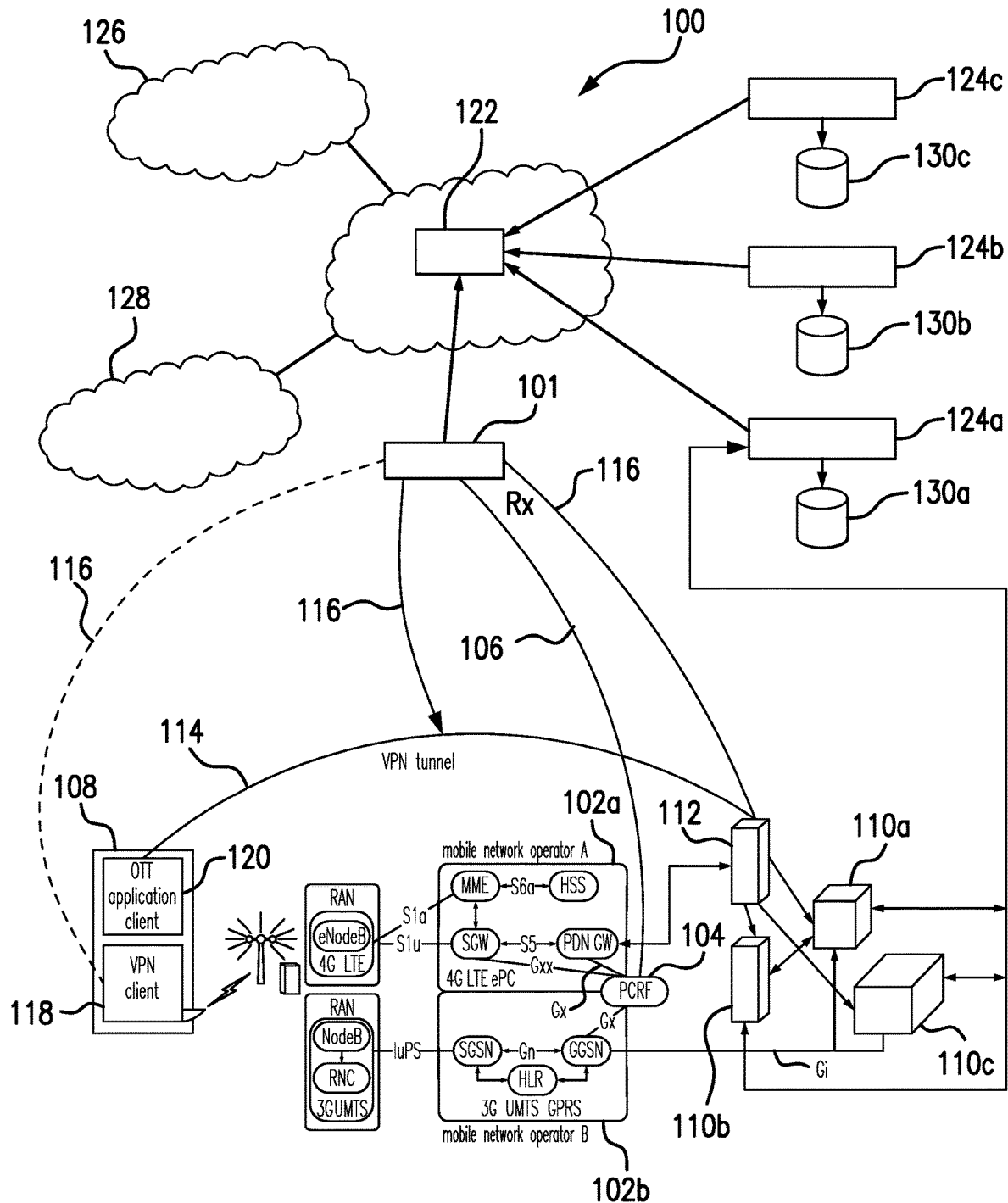
FIG. 1 is a block diagram depicting an embodiment of a real-time network monitoring system constructed in accordance with the embodiments of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In a communication network, traffic or data flows between nodes or network devices along one or more data paths (e.g., from a source node to a destination node including nodes there-between). Isolating traffic or network data relating to network service performance issues for a conventional data path is difficult at best due to an inherent underlying network complexity (e.g., numerous paths, numerous nodes, numerous service enablers etc.). Additionally, with the growing trend of OTT type applications that offer alternatives to a carrier's traditional SMS and Voice services, the growing number of OTT transactions also removes the ability for the carrier's systems to track and report on activity with traditional Call Detail Records (CDR), or SMS usage reports. Embodiments of the present invention provide improved techniques for network monitoring to facilitate quicker and more accurate network service triaging with respect to OTT applications. To monitor service performance in a communication network a plurality of devices dedicated to monitoring data transmitted over one or more communication networks (e.g., wireless networks) are configured to monitor various metrics, such as certain Key Performance Indicators (KPIs), and provide data indicative of patterns of important metrics over time. According to an embodiment of the present invention, one or more monitoring devices summarize a plurality of observed data packets into a compact Adaptive Session Intelligence (ASI) data set for storage and processing. The ASI data set provides the analysis granularity required to extract rich network, service- and user-related metrics on devices, subscribers, OTT applications, and the like. Each record in the ASI data set may be updated in real-time. Depending on protocols, a network monitoring system extracts different sets of information, removes redundant information from the plurality of data packets, and focuses on the various types of performance problems affecting end users of numerous OTT applications.

Embodiments of the present invention address a scenario wherein an OTT application client on user equipment (UE) is connected to a cloud based OTT application server via a virtual private network (VPN) connection, for example. A conventional VPN connection provides additional transport security to OTT application data traversing a commercial wireless network, by tunneling original IP packets inside outer IP packets in an encrypted fashion. Mechanisms for establishing a virtual private network (VPN) tunnel appropriate to convey OTT application data are well known to those skilled in the art.

Embodiments of the present invention may be applied to various VPN technologies, including: a layer 2 tunneling protocol (L2TP) technology, a point-to-point tunneling protocol (PPTP) technology, a transport layer security/virtual private network (VPN) technology, etc. However, for illustrative purposes, the illustrative embodiment of the present invention is described herein via use of an IPSec virtual private network (VPN) technology configured in tunnel mode.

FIG. 1 is a block diagram depicting an embodiment of a real-time network monitoring system constructed in accordance with the principles of the present invention. Information is ordinarily transmitted within the networks in packets and the term packet refers to a unit of data communicated within a network. A packet typically includes a packet source identifier and a packet destination identifier used to navigate the packet data through a network. The term packet may refer to a unit of data through a network. The term packet may refer to a unit of data communicated at any level of an open systems interconnection (OSI) model and between levels of the OSI model.

According to an embodiment of the present invention, the network monitoring system 100 may include one or more monitoring probe 101 (hereinafter referred to as simply "the network monitor"). The network monitors 101 are hardware, software, firmware or a combination thereof for monitoring network communication at various locations or links of one or more commercial wireless networks 102*a*, 102*b*. Each of the network monitors 101 may be deployed at certain locations or links of the wireless networks 102*a*, 102*b* to collect network data traversing the locations or links.

Network monitoring is an important operational scheme for network operators. According to an embodiment of the present disclosure, the network monitoring device 101 may include a user interface (not shown in FIG. 1) that enables a user to interact with the network monitoring device 101, to operate the network monitoring device 101, and to obtain data therefrom, whether at the location of installation or remotely.

After collecting the network data packets, the network monitors 101 generate ASI data sets based on the received packet-flow data, and store the ASI data. The network monitor 101 may be a special purpose computing device or a software component (not limited to a single process) dedicated to monitoring data communicated via the networks 102*a*, 102*b*. Alternatively, the network monitor 101 may be a general purpose computing device with specialized software components installed thereon. In one embodiment, the network monitor 101 is embodied as nGenius Collectors, nGenius Probes or nGenius InfiniStream, available from NetScout Systems, Inc. of Westford, Mass.

In one embodiment, as depicted in FIG. 1, the network monitor 101 is configured to directly interface with one or more commercial wireless networks 102*a*, 102*b* via a conventional policy and charging rules function (PCRF) (i.e. an IP multimedia subsystem (IMS)/long term evolution (LTE) network component) 104. In accordance with the embodiments of the present invention, a connection between the network monitor 101 and the PCRF 104 is preferably established via a diameter Rx interface 106 (3GPP specifications 29.209, 29.214).

Once a connection is established between the PCRF 104 and the network monitor 101, the network monitor 101 takes on the role of a special application function (AF) connected on the backend (i.e. not accessible to a user) of one or more disparate applications. The network monitor 101 also establishes a connection with a VPN server 112 and/or virtual private network (VPN) client 118, when application data exchanged between an OTT application client 120 and one of the plurality of OTT application servers 110*a*-110*c* happens over a VPN tunnel 114.

As depicted in FIG. 1, the network monitor 101 uses a secure VPN client/server interface 116 to interface with a VPN client 118/server 112 on either end of the VPN tunnel 114. In accordance with the embodiments of the present invention, VPN clients 118/servers 112 use a VPN client/server interface 116 to provide relevant tunneling information to the network monitor 101. Relevant tunneling information enables the network monitor 101 to identify IP packets associated with OTT application data transmitted over the VPN tunnel 114.

In accordance with the embodiments of the present invention, the VPN tunnel 114 is established between the VPN client 118 on a user equipment 108, and a fixed infrastructure VPN server 112, so that data traffic transmitted to/from one or more OTT application clients 120 on the user equipment (UE) 108 may traverse the virtual private network (VPN) tunnel 114. The VPN tunnel 114 encrypts and encapsulates an original IP packet inside an outer IP packet while the IP packet is traversing a commercial wireless network. An underlying commercial wireless network 102*a*, 102*b* is typically configured to provide a certain level of quality of service (QoS) treatment to traffic traversing the VPN tunnel 114. For clarity, only one network monitor 101 and only one VPN tunnel 114 are shown in this example. One skilled in the relevant art would recognize that the concepts described herein are equally applicable to monitoring infrastructures comprising different numbers of network monitors 101 than shown in this example. Each of the network monitors 101 may be configured to monitor a plurality of VPN tunnels 114.

In accordance with the principles of the present invention, one or more network monitors 101 may be located separate from a mobile network operator (MNO) 102*a*, 102*b* or co-located with the MNO 102*a*, 102*b*. Possible MNO integration targets currently include: a universal mobile telecommunications system (UMTS), long term evolution (LTE) technology, an evolved-universal mobile telecommunications system (E-UMTS), long term evolution (LTE) technology advanced, and Wi-Fi. The network monitor 101 may easily be extended to support additional network interfaces as technology evolves.

As noted above, VPN(s) may be used by various smart phone OTT applications to access data in a secure manner and typically involve tunneling of original application IP packets in an encrypted fashion inside of an outer IP packet. Advantageously, embodiments of the present invention provide successful means of quickly and efficiently identifying data related to various OTT applications, including OTT applications transmitting data over a VPN tunnel, without parsing an encrypted payload. More specifically, the network monitor 101 configured to analyze data traversing a plurality of VPN tunnels 114 in real time is further configured to utilize data stored in a central repository 122 to uniquely identify various OTT applications and may be configured to generate ASI data related to the identified OTT applications.

According to an embodiment of the present invention, as shown in FIG. 1, the data identifying one or more OTT applications that is stored in the central repository 122 may be captured and dynamically maintained by one or more active agents 124*a*-124*c*. In various embodiments, each active agent 124 may be implemented as integral components of network monitoring probes or may be implemented as stand-alone devices. The active agents 124*a*-124*c* can be hardware or software devices, and may be configured to generate OTT application identifying information. In one embodiment, the active agents 124*a*-124*c* include a processor and a memory device coupled to the processor. The memory device contains a set of instructions to be executed by the processor.

It should be noted that many modern OTT applications expand their service globally. For example, a Content Delivery Network (CDN) may include a plurality of nodes (e.g., OTT servers) spread around the world. Furthermore, a content distributor maybe required to create different links to the same streaming content in order to differentiate users in different regions. Thus, information identifying a particular OTT service may differ in different geographic regions.

According to an embodiment of the present invention, the active agents 124a-124c can be distributed geographically around the world to facilitate identification of OTT service providing nodes that could be located anywhere in the world. A challenge to such a distributed arrangement of active agents 124a-124c is to construct a shared repository for assigning identifying information to various global OTT applications. In one embodiment, such repository 122 may comprise a distributed cloud-based repository.

At least in some embodiments, each mobile network operator may have their own operator clouds. An "operator cloud" is interposed between mobile subscribers and the Internet. The operator cloud can provide services through aggregation, including the tracking of subscriber usage. The operator cloud services can produce accurate metrics concerning mobile Web traffic while safeguarding subscriber personal information. In FIG. 1, a first operator cloud 126 may be used by a mobile network operator A, while a second operator cloud 128 may be used by a mobile network operator B. In one embodiment, data stored in the repository 122 may be shared between the operator clouds 126 and 128. Alternatively, each network operator may maintain their own copies of OTT identifying information in their respective repositories located in operator clouds 126 and 128, for example. Thus, at least some of the active agents 124a-124c may be dedicated to servicing a specific network operator. Operation of active agents 124a-124c is described in more detail below in conjunction with FIG. 4.

Figure 2:
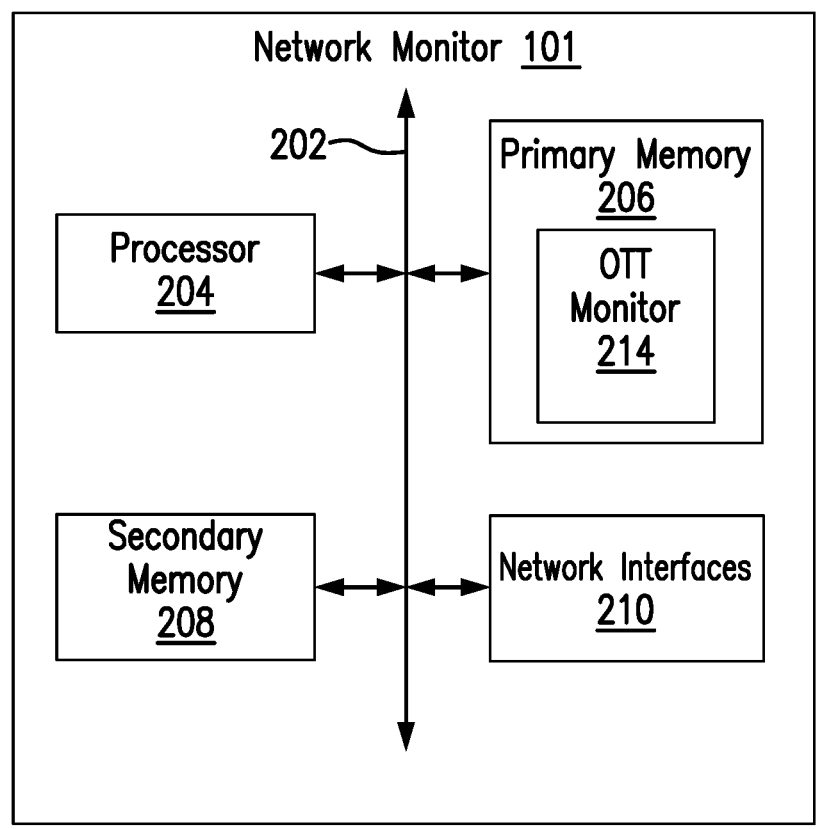
FIG. 2 is a block diagram of the network monitor of FIG. 1, according to one embodiment of the present invention.

FIG. 2 is a block diagram of the network monitor 101, according to one embodiment of the present invention. The network monitor 101 may include, among other components, a processor 204, primary memory 206, secondary memory 208, and one or more network interface(s) 210. These components are connected and communicate via a bus 202. The network monitor 101 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the network monitor 101.

The primary memory 206 is a computer readable storage medium that stores, among other data, computer instruction modules for processing, storing and retrieving network traffic data. The primary memory 206 may be implemented in various data storage devices (e.g., Random-Access Memory (RAM)) having a faster access speed compared to the secondary memory 208. The faster access speed of the primary memory 206 allows the network monitor 101 to analyze received packet data in real time.

The secondary memory 208 may be a secondary storage device for storing, among others, the processed ASI data sets. The secondary memory 208 may be embodied, for example, as a solid-state drive, hard disk or other memory devices capable of storing a large amount of data compared to the primary memory 206.

The network interfaces 210 may include a NIC (network interface card) or other standard network interfaces to receive packet flow data sets. For example, the network interfaces 210 may be an Ethernet interface, a WiFi (IEEE 802.11) interface or other types of wired or wireless network interfaces. In one embodiment, two or more network interfaces are used to communicate with different types of networks or perform specialized functions.

In one embodiment, the network interface 210 sends the captured network packets directly to an OTT monitor 214. The network interface 210 may send one data set of packet data to the OTT monitor 214 for processing and another packet data set for storing in the secondary memory 208. Alternatively, the network interface 210 may send the packet data to the OTT monitor 214 and not to the secondary memory 208. That is, the OTT monitor 214 receives the captured packet data sets from the network interface 210, determines if any of the received packets are associated with one of the OTT applications based on the data stored in the central repository 122, generates ASI data set related to one or more identified OTT applications and sends the generated datasets to the secondary memory 208. By receiving the captured packet flow data directly from the network interface 210, the OTT monitor 214 can process the packet data at a high speed without delays associated with accessing the secondary memory 208.

Figure 4:
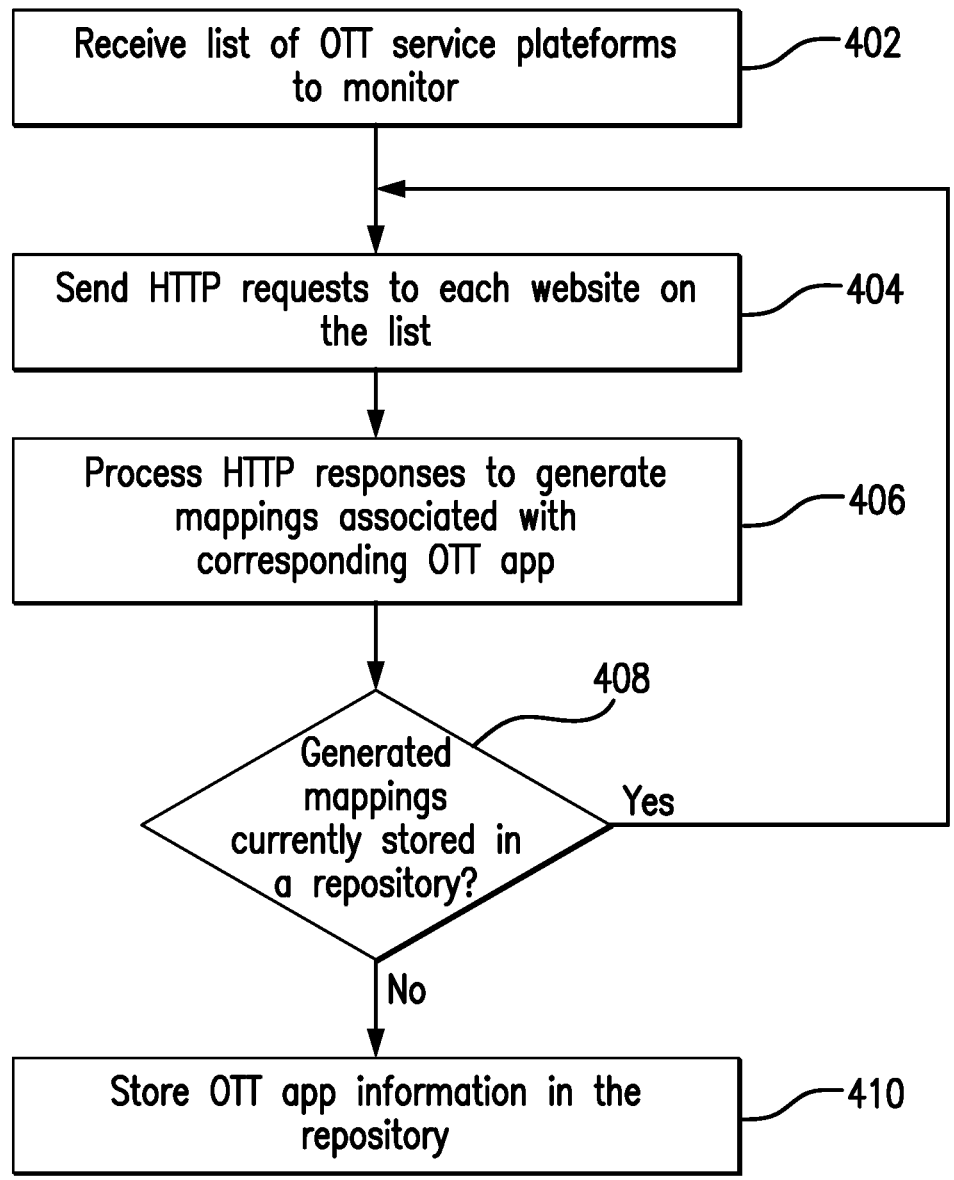
FIGS. 4 and 5 are flow charts depicting an embodiment of a method for deter Wining OTT applications and services without parsing an encrypted payload and illustrating steps performed by the active agent of FIG. 1 and by the network monitor of FIG. 1, respectively, in accordance with disclosed embodiments of the present invention.
Figure 5:
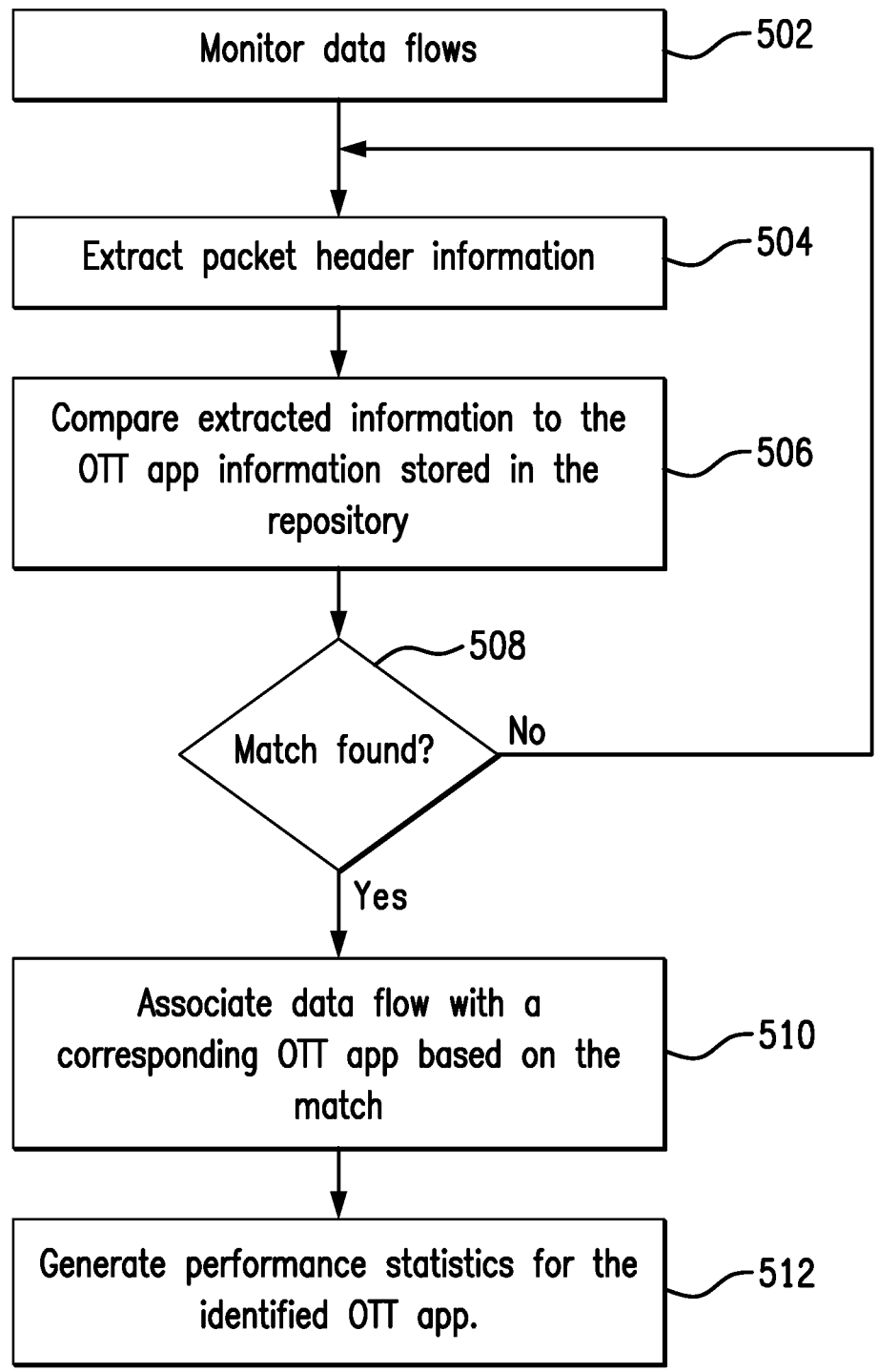

FIGS. 4 and 5 are flowcharts illustrating a method for determining OTT applications and services without parsing an encrypted payload and illustrating steps performed by the active agent of FIG. 1 and by the network monitor of FIG. 1, respectively, in accordance with disclosed embodiments of the present invention. Before turning to description of FIGS. 4 and 5, it is noted that the flow diagrams in these figures show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be performed. As will be appreciated by one skilled in the art, aspects of the present invention may be embodied as a method or computer program product.

Starting with FIG. 4, at step 402, the active agent 124 receives a list of OTT service platforms to be monitored. The OTT service platforms may be controlled and operated by distinct entities. Some examples of OTT service applications may include Facebook, Skype, Google+, Twitter and other messaging or communication applications. As noted above, while OTT may benefit end users by avoiding the costs of using services such as SMS or traditional Voice services and replacing them with "data based" alternatives, it also reduces visibility to the user's activities. In one embodiment, the list of OTT service applications to be monitored may be predefined and stored in a database 130. According to an embodiment of the present invention, the active agents 124a-124c can be distributed geographically around the world to facilitate identification of OTT service providing nodes that could be located anywhere in the world. In this embodiment, the corresponding databases 130a-130c storing predefined lists of OTT service applications to monitor may be geographically distributed as well. In one embodiment, the list of OTT service applications received at step 402 includes one or more URLs corresponding to one or more OTT service providers. In one embodiment, this list of URLs may be established, for example, by a wireless service provider or an Internet Service Provider (ISP).

According to an embodiment of the present invention, at step 404, the active agent 124 periodically connects to each of the URLs included in the received list. For example, a first active agent 124a may connect to each of the OTT application servers 110a-110c by sending HTTP requests for given byte ranges of the content of interest, e.g., fragments of a video, software download, or other content. As a more specific example, the first active agent 124a may send an HTTP GET request to a YouTube server (e.g., OTT application server 110a) with the URL of a video (included in the received list) in the selected format. The YouTube server 110a sends back an HTTP response. Similarly, the active agent 124 may send requests to other OTT application servers 110a-110c. The OTT application servers 110a-110c respond to the HTTP GET requests with HTTP responses that include HTTP headers and bodies.

At step 406, the active agent 124 processes HTTP responses received from one of the OTT application servers 110a-110c. This response, however, may differ from a conventional HTTP response in several respects. In particular, the HTTP response headers may include information identifying an IP address/port number associated with the server/OTT application, a message ID, an OTT application identifier, a status identifier, and, optionally, a data string such as a secret token T. In one embodiment, the HTTP response body, however, is empty (e.g., it is devoid of (does not include) the content requested by the HTTP GET request). It should be noted these communications occur via TCP. According to an embodiment of the present invention, step 406 further involves processing of the received HTTP response headers to generate one or more mappings associated with a particular OTT application (e. g., IP address/port/OTT application identifier mappings). It is further noted that these mappings may differ for different geographic locations. For instance, Skype service providers may have a plurality of OTT application servers 110 spread around the world. Each of these servers may have a different IP address and different OTT application identifier. According to an embodiment of the present invention, the active agent 124 may periodically perform steps 402 and 404 to automatically determine changes that may occur within the distributed arrangement of OTT application servers 110. In one embodiment, steps 402, 404 and 406 are performed according to a predefined period.

According to an embodiment of the present invention, at step 408, the active agent 124 may search the central repository 122 to determine if newly generated mapping already exists there. In response to finding a match between the mapping generated in step 406 and another entry previously stored in the central repository 122 (decision block 408, "Yes" branch), the active agent 124 may return back to step 404. If there is no match (decision block 408, "No" branch), at step 410, the active agent 124 stores the OTT application mapping information generated in step 406 in the central repository 122.

Figure 3A:
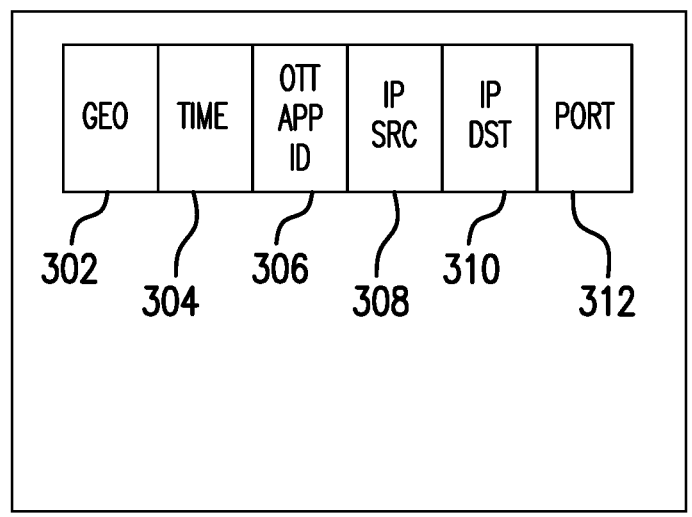
FIG. 3A illustrates exemplary OTT identifying information stored in the repository of FIG. 1. in accordance with embodiment of the present invention.

FIG. 3A illustrates OTT identifying information stored in the repository 122 of FIG. 1. in accordance with one embodiment of the present invention. In the illustrated embodiment, each entry may include, but is not limited to the following fields: a geo-location identifier 302, a timestamp 304, an OTT application identifier 306, a source IP address 308, a destination IP address 310 and a port number 312. The geo-location identifier 302 represents a physical location of the OTT node (e.g., the first OTT server 110a) identified by the OTT identifier. The timestamp 304 represents the time and/or date associated with each geolocation. The OTT application identifier 306 represents the identifier extracted by the active agent 124 from the HTTP header in step 406. The OTT identification information stored in the central repository 122 may also include data routing information (e.g., the destination IP address 310 and the port number 312) associated with the OTT application server 110.

Referring now to FIG. 5, the flowchart illustrating exemplary steps performed by the network monitor 101, at step 502, the network monitor 101 monitors a plurality of data flows between a plurality of sources and destinations on a monitored mobile (wireless) network. Each of the plurality of data flows may include a plurality of data packets associated with various OTT applications. In one embodiment, the OTT monitor module 214 may monitor application data exchanged between the OTT application client 120 and one of the plurality of OTT application servers 110 over the VPN tunnel 114. Step 502 may further involve passively capturing one or more data flow packets by the network monitor 101. In other words, generally, the network monitor 101 passively monitors network traffic without participating in the communication protocols. In some embodiments, packet copies may be provided to the network monitors 101 from a specialized network tap.

Figure 3B:
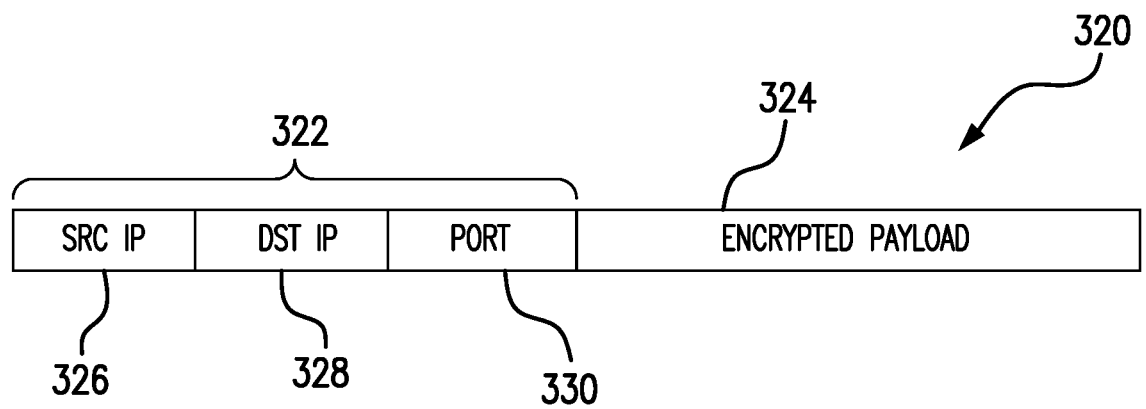
FIG. 3B is an illustration showing various example fields of an example data flow packet passively captured by the network monitor of FIG. 1 in accordance with an embodiment of the present invention.

At step 504, the OTT monitor module 214 of the network monitor 101 extracts at least a portion of packet header information from the captured packet copies. FIG. 3B is an illustration showing various example fields of an example data flow packet passively captured by the OTT monitor module 214, in accordance with an embodiment of the present invention. In this example, the captured packet 320 consists of a header 322 and encrypted payload 324. In turn, the header information 322 may include source and/or destination IP addresses, ports (e.g., TCP ports, UDP ports, etc.) and/or protocols (e.g., SIP, RTP). Accordingly, using the example shown in FIG. 3B, at step 504, the OTT monitor module 214 extracts source 326 and destination 328 IP addresses and the port number 330 from the header 322 of the captured packet 320.

According to an embodiment of the present invention, at step 506, the OTT monitor module 214 compares the information extracted from the captured packet 320 to information stored in the central repository 122. In other words, at step 506, when the extracted packet header information is compared to information about the OTT applications stored in the central repository 122, including but not limited to source, destination IP addresses and the port number, the OTT monitor module 214 may be able to detect association between the captured packet and at least one OTT application.

If no match is found (decision block 508, "No" branch), the OTT monitor module 214 may move on to evaluate next captured packet, by returning to step 504, according to an embodiment of the present invention. In response to determining that the extracted header information matches at least one entry in the central repository 122 (decision block 508, "yes" branch), the OTT monitor module 214 performs step 510 next.

According to an embodiment of the present invention, at step 510, the OTT monitor module 214 associates a captured packet of data flow with a corresponding OTT application. In other words, if the extracted header information 322, such as, but not limited to, the source IP address 326, destination IP address 328 and port number 330 matches corresponding fields 308-312 of a particular entry stored in the central repository 122, then the OTT monitor module 214 associates an OTT application identified by the value stored in the OTT application ID field 306 of the matching entry with the captured packet and with the corresponding data flow.

Once the OTT monitor module 214 associates the monitored data flow with one of the OTT applications, according to an embodiment of the present invention, the OTT monitor module 214 may generate a plurality of performance statistics (ASI data set) related to the identified OTT application. As noted above, the ASI data set provides performance metadata with analysis granularity required to extract rich network, service-related metrics on devices, subscribers, OTT applications, etc. A generated data set may be labeled with a time period. In one embodiment, the generated ASI data set may correspond to a one hour time period. The ASI data set may include, among others, metrics of various types related to OTT services. Each data set may contain information about some metric, e.g. total number of requests or percentage of timeouts, at the sample time that the data set is captured.

In view of the above, various embodiments of the present invention are directed to means of automatically identifying data related to various OTT applications, including OTT applications transmitting data over a VPN tunnel, without parsing an encrypted payload. According to an embodiment of the present invention, the active agent 124 is configured to automate OTT application identification by collecting and storing relevant information in the central repository. Various embodiments of the present invention may be applied to any wireless network, including, but not limited to: a universal mobile telecommunications system (UMTS), long term evolution (LTE) technology, an evolved-universal mobile telecommunications system (E-UMTS), long term evolution (LTE) technology advanced, and Wi-Fi.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining Over-The-Top (OTT) applications and services without parsing an encrypted payload, the method comprising steps of:
    receiving, by an active agent, a list of OTT service platforms to be monitored by the active agent, wherein the received list comprises a plurality of URLs associated with various applications that are delivered by the OTT service platforms;
    connecting, by the active agent, to the plurality of URLs to determine information uniquely identifying one or more of the OTT service platform applications;
    storing, by the active agent, the information uniquely identifying one or more of the OTT applications in a repository;
    monitoring, by a computer processor in a network monitor, a plurality of data flows between a plurality of sources and destinations on a network, each of the plurality of data flows comprising a plurality of data packets of the various applications that are delivered by the OTT service platforms;
    extracting, by the computer processor of the network monitor, at least a portion of header information from each of the plurality of monitored data packets;
    identifying, by the computer processor of the network monitor, an OTT application occurring on the network based on the extracted header information and based on the information uniquely identifying various OTT applications stored in the repository;
    collecting a plurality of performance metrics related to an identified OTT application; and
    generating an Adaptive Session Intelligence (ASI) data set having a plurality of performance statistics relating to an identified OTT application.

2. The method of claim 1, wherein the extracted header information comprises one or more of a source address, source port, destination address and destination port.

3. The method of claim 1, wherein the active agent comprises a plurality of agents which are geographically distributed.

4. The method of claim 1, wherein payload of at least some of the plurality of monitored data packets is encrypted.

5. The method of claim, 1 wherein the repository comprises a distributed cloud environment system.

6. The method of claim, 1 wherein the step of storing, by the active agent, the extracted information related to the identified OTT application in the repository further comprises storing one or more of: a geo-location identifier, a timestamp, an OTT application identifier and one or more IP addresses associated with the identified OTT application in the repository.

7. The method of claim 1, wherein the network monitor is a probe.

8. The method of claim 1, wherein the network comprises one of a universal mobile telecommunications system (UMTS) network, long term evolution (LTE) network, an evolved-universal mobile telecommunications system (E-UMTS) network, LTE advanced network and Wi-Fi network.

9. The method of claim 1, wherein the step of connecting, by the active agent, to the plurality of URLs further comprises sending, by the active agent, one or more HTTP requests to one or more OTT application servers.

10. A system for determining Over-The-Top (OTT) applications and services without parsing an encrypted payload, the system comprising:
    a repository configured to receive and store information uniquely identifying one or more OTT applications;
    an active agent comprising a first processor and a first memory device coupled to the first processor in communication with the repository, the first memory device containing a set of instructions that, when executed by the first processor, cause the first processor to:
        receive a list of OTT service platforms to be monitored, wherein the received list comprises a plurality of URLs associated with various applications that are delivered by the OTT service platforms;
        connect to the plurality of URLs to determine information uniquely identifying one or more of the OTT service platform applications; and
        store the information uniquely identifying one or more of the OTT applications in the repository; and
    a network monitor comprising a second processor and a second memory device coupled to the second processor in communication with the repository, the second memory device containing a set of instructions that, when executed by the second processor, cause the second processor to:
        monitor a plurality of data flows between a plurality of sources and destinations on a network, each of the plurality of data flows comprising a plurality of data packets of the various applications that are delivered by the OTT service platforms;
        extract at least a portion of header information from each of the plurality of monitored data packets;
        identify an OTT application occurring on the network based on the extracted header information and based on the information uniquely identifying various OTT applications stored in the repository
        collect a plurality of performance metrics related to an identified OTT application; and
        generated an Adaptive Session Intelligence (ASI) data set having a plurality of performance statistics relating to an identified OTT application.

11. The system of claim 10, wherein the extracted header information comprises one or more of a source address, source port, destination address and destination port.

12. The system of claim 10, wherein the active agent comprises a plurality of agents which are geographically distributed.

13. The system of claim 10, wherein payload of at least some of the plurality of monitored data packets is encrypted.

14. The system of claim 10, wherein the set of instructions that, when executed by the second processor, further cause the second processor to collect a plurality of performance metrics related to the identified OTT application.

15. The system of claim 14, wherein the repository comprises a distributed cloud environment system.

16. The system of claim 14, wherein the set of instructions that, when executed by the first processor, cause the first processor to store the extracted information further cause the first processor to store one or more of a geo-location identifier, a timestamp, an OTT application identifier and one or more IP addresses associated with the identified OTT application in the repository.

17. The system of claim 10, wherein the network monitor is a probe.

18. The system of claim 10, wherein the network comprises one of a universal mobile telecommunications system (UMTS) network, long term evolution (LTE) network, an evolved-universal mobile telecommunications system (E-UMTS) network, LTE advanced network and Wi-Fi network.

19. The system of claim 10, wherein the set of instructions that, when executed by the first processor, cause the first processor to connect to the plurality of URLs further cause the first processor to send one or more HTTP requests to one or more OTT application servers.

\* \* \* \* \*